Sept. 27, 1932.  J. W. HEINEY  1,879,744
BRAKE DISK
Filed March 14, 1930
*Fig.1*
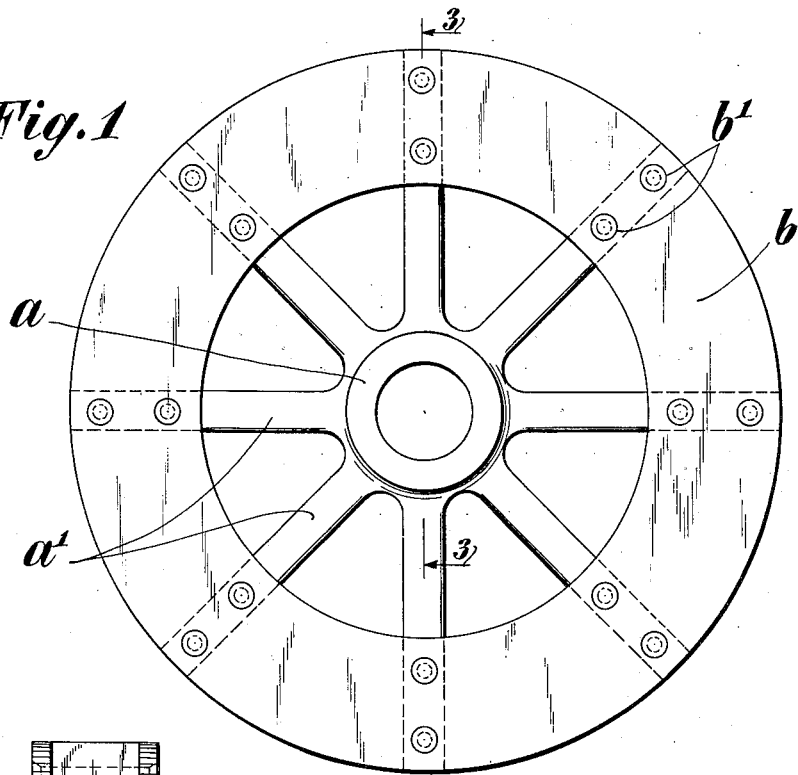
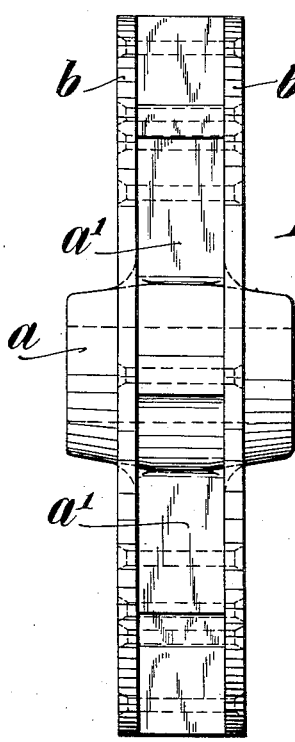
*Fig.2*
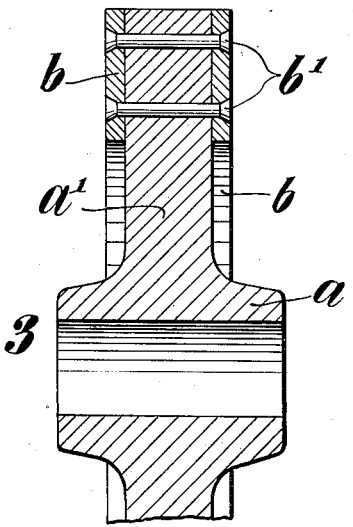
*Fig.3*
INVENTOR
John W. Heiney,
BY Redding, Greeley, O'Shea + Campbell
HIS ATTORNEY Patented Sept. 27, 1932

1,879,744

UNITED STATES PATENT OFFICE

JOHN W. HEINEY, OF ALLENTOWN, PENNSYLVANIA, ASSIGNOR TO INTERNATIONAL MOTOR COMPANY, OF NEW YORK, N. Y., A CORPORATION OF DELAWARE

BRAKE DISK

Application filed March 14, 1930. Serial No. 435,697.

The present invention relates to disks for brake mechanisms for motor vehicles and embodies, more specifically, an improved brake disk by means of which the operation thereof may be materially improved and the construction greatly facilitated.

In previous brake constructions wherein a disk is used as one of the braking elements, the disk has either been cast in the desired shape or assembled by spacing annular disks back to back and securing the same to a cast spider which serves as a hub. In the form embodying a solid casting vents have been provided to facilitate cooling of the disk and the construction thereof has been rendered more difficult and expensive by means of the difficulty of casting such vents as well as preserving the balance of the disk after the vents have been formed. Where the brake disk has heretofore been assembled, as described above, the spaced disks have been stamped with suitable ribs which are positioned back to back and secured in this relationship, thus enabling the ribs to serve as spacing elements, as well as providing the necessary vents for cooling.

With the foregoing in mind, an object of the present invention is to provide a brake disk which is easily constructed and assembled, the parts thereof being readily manufactured in quantities and of standard construction whereby the expense of manufacture and maintenance is materially decreased.

A further object of the invention is to provide a brake disk, the construction of which is such as to promote adequate ventilation and cooling of the friction plates, the entire disk being assembled as a unit and the parts thereof being simple of construction and relatively inexpensive to manufacture.

Further objects, not specifically enumerated above, will be apparent as the invention is described in greater detail in connection with the accompanying drawing, wherein:

Figure 1 is a view in front elevation, showing a brake disk constructed in accordance with the present invention.

Figure 2 is a view in side elevation, showing the disk of Figure 1.

Figure 3 is a view in section, taken on line 3—3 of Figure 1, and looking in the direction of the arrows.

Referring to the above drawings, $a$ designates a hub formed with arms $a'$ which preferably serve as a wheel spider. This hub may be a casting formed with the arms $a'$ and the construction thereof is such as to facilitate adequate ventilation of the disk as described hereinafter.

Adjacent the outer extremities of the arms $a'$, spaced friction plates $b$ are mounted, rivets $b'$ or other suitable means being provided to secure the plates in proper position upon the arms $a'$. It is preferred that the plates $b$ be annular in shape and secured in the manner shown in Figure 3.

It will thus be seen that the arms $a'$ not only serve as supporting arms for the friction plates and thus as a spider for the brake disk, but also serve as spacers for the plates $b$, the space between adjacent arms permitting the flow of cooling air between the plates and thus effecting adequate cooling of the disk structure.

From the foregoing, it will be seen that great accuracy in constructing the hub and spider arms need not be exercised, the annular plates $b$ being readily manufactured by stamping or otherwise and being of such construction that the desired degree of accuracy may readily be exercised in the stamping operation. Not only do the arms $a'$ serve as spacers for the friction plates $b$, and a supporting spider therefor, but also as vanes by means of which cooling air is circulated between the plates.

While the invention has been described with specific reference to the accompanying drawing, it is not to be limited, save as defined in the appended claim.

I claim as my invention:

A brake disk comprising a pair of annular friction plates, and a hub member having a plurality of substantially radial arms interposed between said plates, said arms constituting means for maintaining the plates in spaced relation so as to afford passages between the plates permitting the free circulation of air, the inner marginal edges of said plates being spaced from the inner ends of said arms to provide the disk with transversely extending substantially V-shaped openings communicating with the passages between the plates, said plates being rigidly secured to the arms.

This specification signed this 4th day of March A. D. 1930.

JOHN W. HEINEY.